United States Patent [19]

Lafser, Jr. et al.

[11] Patent Number: 4,921,538
[45] Date of Patent: May 1, 1990

[54] METHOD FOR RECYCLE AND USE OF CONTAMINATED SOIL AND SLUDGE

[75] Inventors: Fred A. Lafser, Jr., St. Louis; Robert J. Schreiber, Jr., Ashland, both of Mo.

[73] Assignee: Industrial Waste Management, Inc., St. Louis, Mo.

[21] Appl. No.: 207,637

[22] Filed: Jun. 16, 1988

[51] Int. Cl.$^5$ .............................................. C04B 7/02
[52] U.S. Cl. ................................... 106/100; 501/155; 106/103; 106/286.6
[58] Field of Search .................... 106/90, 100, 103, 97, 106/900, 286.6, 440, 441; 210/911, 912; 501/155

[56] References Cited

U.S. PATENT DOCUMENTS

| | | | |
|---|---|---|---|
| 4,022,630 | 5/1977 | Watson et al. | 106/103 |
| 4,256,503 | 3/1981 | Tsuda et al. | 106/100 |
| 4,640,681 | 2/1987 | Steinbiss et al. | 432/14 |
| 4,678,514 | 7/1987 | Deyhle et al. | 106/100 |

FOREIGN PATENT DOCUMENTS 2918738 11/1979 Fed. Rep. of Germany ...... 106/100

Primary Examiner—William R. Dixon, Jr.
Assistant Examiner—Chris Gallo
Attorney, Agent, or Firm—Sennniger, Powers, Leavitt and Roedel

[57] ABSTRACT

Process for recycle and reuse of soil, sludge, sand, or rock containing: (a) at least about 16 wt % calcium oxide, about 5 wt % silica, about 1 wt % alumina, about 0.5 wt % $Fe_2O_3$, or about 0.76 wt % magnesia; and (b) at least about 5 ppm arsenic, about 100 ppm barium, about 1 ppm cadmium, about 5 ppm chromium, about 5 ppm lead, about 0.2 ppm mercury, about 1 ppm selenium, or about 5 ppm silver. The process comprising mixing the soil, sludge, sand, or rock with an amount of inorganic constituents to form a raw material mix having a chemical composition suitable for the manufacture of Portland cement, charging the slurry to a cement kiln, heating the slurry in the kiln to a temperature sufficient to form a cement clinker, and removing the cement clinker from the rotary kiln.

15 Claims, 2 Drawing Sheets

1

METHOD FOR RECYCLE AND USE OF CONTAMINATED SOIL AND SLUDGE

BACKGROUND OF THE INVENTION

This invention relates to a method for recycle and use of soil, sludge, sand, and rock contaminated with organic solvents and/or toxic metals and water contaminated with toxic metals. For ease of description, soil, sludge, sand and rock will be collectively referred to herein as earthen mineral matter.

Disposal of earthen mineral matter contaminated with toxic metals and/or organic solvents has increasingly become a problem. Over the last number of years, contaminated earthen mineral matter has become heavily regulated by the United States Government and many state governments. As a result, disposal has become very expensive.

The alternatives for disposal of this material are severely limited. The two principal alternatives are incineration and land filling. However, the presently existing incineration capacity for hazardous wastes in the United States is substantially committed. Moreover, incineration is not a practical method for disposal of toxic metals because incineration of the contaminated material typically results in the vaporization of the metals, thus converting the pollution from one state to another.

Likewise, landfilling is not a satisfactory alternative. Many existing landfills are leaking and the costs of cleaning-up a leaking landfill can be staggering.

Consequently, a need has remained for a safe method of disposal of contaminated earthen mineral matter.

SUMMARY OF THE INVENTION

Among the several objects of the present invention, therefore, may be noted the provision of a method for recycle and use of earthen mineral matter contaminated with organic solvents and/or toxic metals; the provision of such a method which uses the contaminated material as a resource in the manufacture of Portland cement whereby the organic contaminants are used as a secondary fuel source and the toxic metals are physically and/or chemically incorporated into the cement product, a form that is not hazardous.

Briefly, therefore, the present invention is directed to a method for recycle and reuse of contaminated earthen mineral matter in the manufacture of cement clinker, the earthen mineral matter comprising at least about 16 wt % calcium oxide, about 5 wt. % silica, about 1 wt. % alumina, about 0.5 wt. % $Fe_2O_3$ or about 0.76 wt. % magnesia, the contaminated earthen mineral matter containing at least about 5 ppm arsenic, about 100 ppm barium, about 1 ppm cadmium, about 5 ppm chromium, about 5 ppm lead, about 0.2 ppm mercury, about 1 ppm selenium, or about 5 ppm silver. The method comprises mixing the earthen mineral matter with an amount of inorganic constituents and water to form a raw material slurry having a chemical composition suitable for the manufacture of Portland cement, charging the slurry to a cement kiln, heating the slurry in the kiln to a temperature sufficient to form cement clinker, and removing the cement clinker from the rotary kiln.

The present invention is further directed to a method for recycle and reuse of contaminated earthen mineral matter comprising at least about 16 wt % calcium oxide, about 5 wt. % silica, about 1 wt. % alumina, about 0.5 wt. % $Fe_2O_3$ or about 0.76 wt. % magnesia, the contaminated earthen mineral matter containing (a) in excess of 1 part per billion of 2,3,7,8 TCDD or (b) a combined total concentration of at least about 2.16 parts per million of one or more organic compound selected from the group consisting of tetrachloroethylene, trichloroethylene, methylene chloride, 1,1,1-trichloroethane, carbon tetrachloride, chlorinated fluorocarbons, chlorobenzene, 1,1,2-trichloro-1,2,2-trifluoroethane, orthodichlorobenzene, trichlorofluoromethane, 1,1,2-trichloroethane, xylene, acetone, ethyl acetate, ethyl benzene, ethyl ether, methyl isobutyl ketone, n-butyl alcohol, cylcohexanone, methanol, cresols, cresylic acid, nitrobenzene, toluene, methyl ethyl ketone, carbon disulfide, isobtanol, pyridine, benzene, 2-ethoxyethanol, 2-nitropropane, 2,4,5-trichlorophenol, tetrachlorophenol, pentachlorophenol, tetrachlorobenze, pentachlorobenzene, hexachlorobenzene, and polychlorinated biphenyls. The method comprises vaporizing said 2,3,7,8 TCDD and/or said organic compounds from the earthen mineral matter to produce an earthen mineral matter substantially free of said 2,3,7,8 TCDD and said organic compounds, and recovering said 2,3,7,8 TCDD and/or said organic compound vapors produced in said vaporization step, thereafter mixing said free earthen mineral matter with an amount of inorganic constituents and water to form a raw material slurry having a chemical composition suitable for the manufacture of Portland cement, charging the slurry to a cement kiln, heating the slurry in the kiln to a temperature sufficient to form cement clinker, incinerating said recovered vapors in the cement kiln, and removing the cement clinker from the rotary kiln.

The present invention is further directed to a method of recycle and use of water contaminated with at least about 5 mg/l arsenic, about 100 mg/l barium, about 1 mg/l cadmium, about 5 mg/l chromium, about 5 mg/l lead, about 0.2 mg/l mercury, about 1 mg/l selenium, or about 5 mg/l silver. The method comprises mixing the contaminated water with an amount of inorganic constituents and water to form a raw material slurry having a chemical composition suitable for the manufacture of Portland cement, charging the slurry to a cement kiln, heating the slurry in the kiln to a temperature sufficient to form cement clinker, and removing the cement clinker from the rotary kiln.

The present invention is further directed to a cement composition produced according to the process of mixing (a) water contaminated with at least about 5 mg/l arsenic, about 100 mg/l barium, about 1 mg/l cadmium, about 5 mg/l chromium, about 5 mg/l lead, about 0.2 mg/l mercury, about 1 mg/l selenium, or about 5 mg/l silver, or (b) a quantity of earthen mineral matter comprising at least about 16 wt % calcium oxide, about 5 wt. % silica, about 1 wt. % alumina, about 0.5 wt. % $Fe_2O_3$ or about 0.76 wt. % magnesia, the earthen mineral matter containing at least about 5 ppm arsenic, about 100 ppm barium, about 1 ppm cadmium, about 5 ppm chromium, about 5 ppm lead, about 0.2 ppm mercury, about 1 ppm selenium, or about 5 ppm silver with an amount of inorganic constituents and water necessary to form an aqueous raw material slurry having a chemical composition suitable for the manufacture of Portland cement. The process comprises charging the slurry to a cement kiln, heating the slurry in the kiln to a temperature sufficient to form cement clinker, and removing the cement clinker from the rotary kiln, and grinding the cement clinker.

Other objects and features of this invention will be in part apparent and in part pointed out hereinafter.

DESCRIPTION OF A PREFERRED EMBODIMENT

Figure 1:
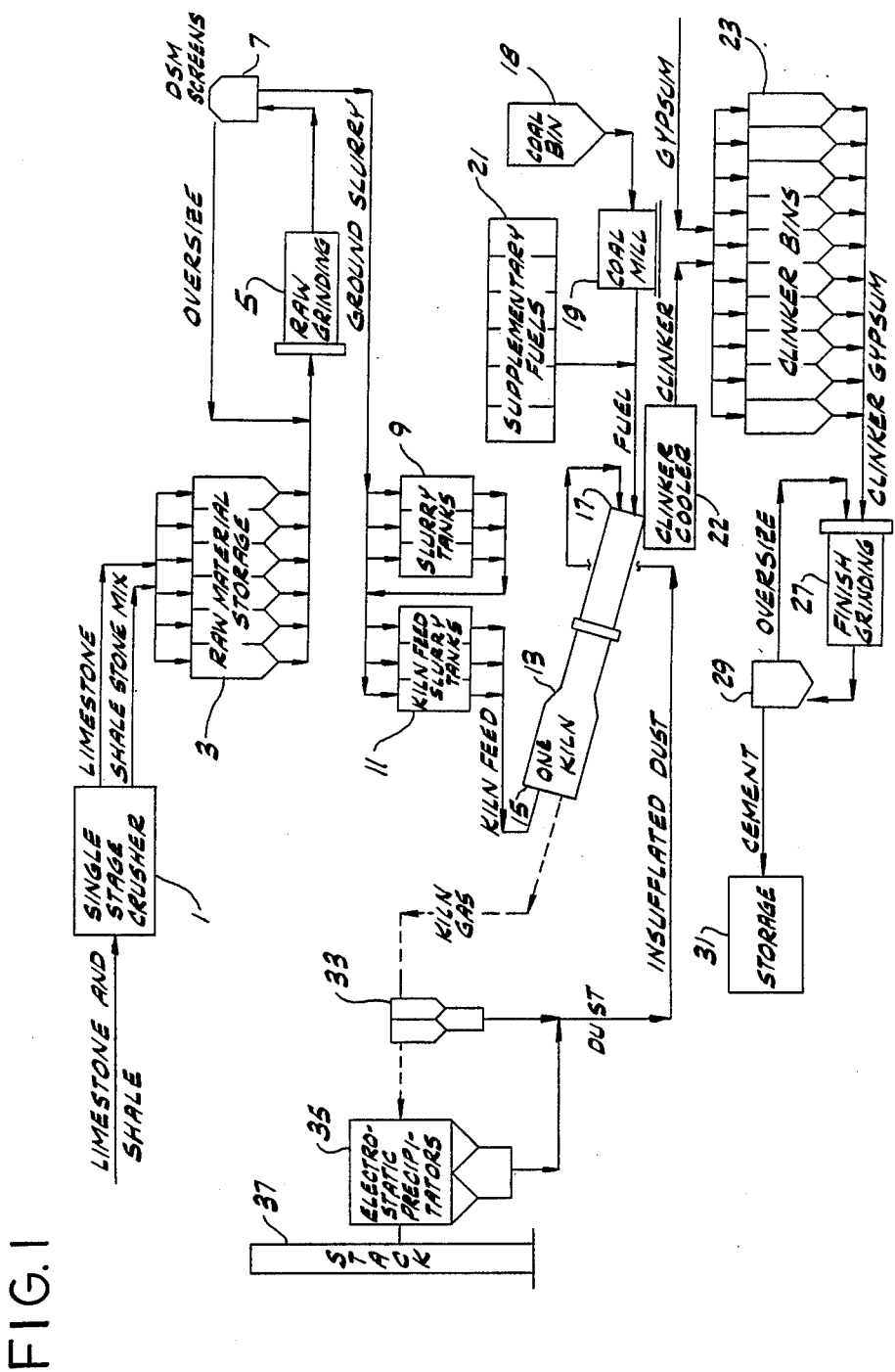
FIG. 1 is a flow plan for a prior art wet process, Portland cement making process.

In FIG. 1, a flow plan for a prior art, wet process, cement making process is depicted. Typical raw materials, such as clay, shale, limestone and silica are crushed in crusher 1 and stored in raw material storage tanks 3. For the manufacture of cement, the raw materials are ground in the wet raw grinding mill 5, sized to about 200 mesh through DSM screens 7 and slurried with water (about 34 wt. % water). The sized, slurried material is routed to the slurry tanks 9 and the kiln feed slurry tanks 11. To meet the necessary ingredient requirements for cement, each of the slurry tanks 11, contains a raw material slurry that differs in composition. Consequently, the operator can achieve the correct blend necessary for cement manufacture in the kiln feed slurry tanks 11, by adding water or raw materials to the kiln feed slurry tanks as necessary.

The kiln feed slurry is introduced to the rotary kiln 13 through the exhaust end 15 of the rotary kiln. Coal stored in bin 18 is ground in mill 19 and introduced to the inlet end 17 of the rotary kiln. The coal may be supplemented by fuel from supplementary fuel source 21. Immediately inside the rotary kiln, the fuel is ignited.

After entering the kiln, the slurry travels down the kiln, passing through three stages. The first is the drying stage where the water from the slurry is evaporated. A series of chains (not shown) are preferably used in this section to enhance the heat exchange process. The second stage comprises a heating process where calcination occurs in the range of 1050°–1850° F. As the material reaches 1850° F., the clinker forming process begins, where materials partially become liquid. Clinkering occurs in the range of 1850°–2650° F. This is principally the mechanism by which small particles are agglomerated into bulk materials. The third stage is the firing stage where the fuel is ignited; the temperature in the firing stage is about 2500°–2800° F.

Cement clinker is removed from the inlet 17 of the kiln 13 and cooled in the clinker cooler 22. After cooling, the clinker is transferred to the clinker bins 23 along with gypsum to form a mixture comprising about 5 wt. % gypsum. Thereafter, the clinker/gypsum blend is ground at the finish grinding station 29 and sent to storage bins 31.

Exhaust gasses from the rotary kiln 13 are removed from the outlet 15 and transferred to the expansion chamber 33, to the electrostatic precipitator 35 and then to the stack 37. Dust from the expansion chamber 33 and the electrostatic precipitator are returned to the inlet 17 of the rotary kiln 13.

For the manufacture of Portland cement, the compositional limits of the kiln feed slurry are approximately as follows (on a loss-free basis):

|  | Wt. Percent |
| --- | --- |
| CaO | 60–67 |
| $SiO_2$ | 17–25 |
| $Al_2O_3$ | 3–8 |
| $Fe_2O_3$ | 0.5–6.0 |
| MgO | 0.1–5.5 |
| $Na_2 + K_2O$ | 0.5–1.3 |
| $SO_3$ | 1–3 |

However, the composition of the kiln feed slurry varies from one cement producer to the next, depending upon the composition of the raw materials, such as limestone, clay, shale and silica and minor additional constituents available to the producer. Thus, the suitable raw materials used to satisfy the necessary chemical composition vary widely across the nation with natural resources specific to the area of the producer usually predominating. More than 30 different materials are known to be used in this process.

In a particularly preferred embodiment of the present invention, the kiln feed slurry and the resulting cement clinker product have the following compositions (excluding the toxic metal content):

|  | slurry raw mix (wt %) | clinker (wt %) |
| --- | --- | --- |
| silica | 14.31 | 23.00 |
| calcium oxide | 42.81 | 65.90 |
| alumina | 2.80 | 4.55 |
| iron ($Fe_2O_3$) | 1.28 | 2.42 |
| magnesia | 1.94 | 2.40 |
| sulfur ($SO_3$) | — | 0.40 |
| potassium ($K_2O$) | — | 0.63 |
| sodium ($Na_2O$) | — | 0.08 |
| loss on ignition | 35.95 | 0.23 |

On a loss-free basis, the kiln feed slurry and the resulting cement clinker product have the following compositions (excluding the toxic metal content) in a particular)y preferred embodiment of the present invention:

|  | slurry raw mix (wt %) | clinker (wt %) |
| --- | --- | --- |
| silica | 22.66 | 23.07 |
| calcium oxide | 67.80 | 66.09 |
| alumina | 4.43 | 4.56 |
| iron ($Fe_2O_3$) | 2.03 | 2.43 |
| magnesia | 3.07 | 2.41 |
| sulfur ($SO_3$) | — | 0.40 |
| potassium ($K_2O$) | — | 0.63 |
| sodium ($Na_2O$) | — | 0.08 |

In accordance with the present invention, it has been discovered that earthen mineral matter, i.e., soil, sludge, sand, and rock, contaminated with certain organic compounds and/or toxic metals are suitable for use as a raw material for cement manufacture. In the context of this invention, contaminated earthen mineral matter shall be interpreted to mean earthen mineral matter containing non-naturally occuring levels of toxic metals or certain organic compounds rendering the earthen mineral matter potentially harmful to human health or the environment. Earthen mineral matter comprising at least about 16 wt % calcium oxide, about 5 wt. % silica, about 1 wt. % alumina, about 0.5 wt. % $Fe_2O_3$ or about 0.76 wt. % magnesia contribute necessary constituents to the cement formulation. Moreover, the toxic metals, i.e., arsenic, barium, cadmium, chromium, lead, mercury, selenium, and silver when present in low levels, do not degrade the quality of the resulting cement product. Preferably, the total metal content does not exceed approximately 4 wt % of the cement product and the toxic metal content does not exceed about 1 wt % of the cement product.

The net result from the use of such contaminated materials is the recovery and reuse of resources from the earthen mineral matter and disposal/destruction of the contaminants. Moreover, during the cement making process, the toxic metals are physically and/or chemically incorporated into the cement product, rendering the previously hazardous material, non-hazardous. Thus, the process of the present invention offers significant advantages over previously known disposal methods.

Current regulations of the United States Environmental Protection Agency (40 CFR §261, 1987) define a solid waste as being a hazardous waste if it exhibits the characteristic of Extraction Procedure (EP) toxicity. More specifically, a solid waste (including earthen mineral matter) constitutes a hazardous waste if the concentration of toxic metal in the extract from the waste exceeds the following EP toxicity limits:

5.0 mg/l arsenic,
100.0 mg/l barium,
1.0 mg/l cadmium,
5.0 mg/l chromium,
5.0 mg/l lead,
0.2 mg/l mercury,
1.0 mg/l selenium, or
5.0 mg/l silver.

According to current regulations of the United States Environmental Protection Agency (40 CFR §24, 1987), the following procedure (reproduced from the regulations) is to be used to determine EP toxicity.

1. A representative sample of the waste to be tested (minimum size 100 grams) shall be obtained.
2. The sample shall be separated into its component liquid and solid phases using the method described in "Separation Procedure" below. If the solid residue obtained using this method totals less than 0.5% of the original weight of the waste, the residue can be discarded and the operator shall treat the liquid phase as the extract and proceed immediately to Step 8. The percent solids is determined by drying the filter pad at 80° C until it reaches constant weight and then calculating the percent solids using the following equation:

$$\frac{\text{(weight of pad + solid)} - \text{(tare weight of pad)}}{\text{initial weight of sample}} \times 100$$

3. The solid material obtained from the Separation Procedure shall be evaluated for its particle size. If the solid material has a surface area per gram of material equal to or greater than 3.1 cm or passes through a 9.5 mm (0.375 inch) standard sieve, the operator shall proceed to Step 4. If the surface area is smaller or the particle size is larger than specified above, the solid material shall be prepared for extraction by crushing, cutting or grinding the material so that it passes through 9.5 mm (0.375 inch) sieve or, if the material is in a single piece, by subjecting the material to the "Structural Integrity Procedure" described below.
4. The solid material obtained in Step 3 shall be weighed and placed in an extractor with 16 times its weight of deionized water. Do not allow the material to dry prior to weighing. For purposes of this test, an acceptable extractor is one which will impart sufficient agitation to the mixture to not only prevent stratification of the sample and extraction fluid but also insure that all sample surfaces are continuously brought into contact with well mixed extraction fluid.
5. After the solid material and deionized water are placed in the extractor, the operator shall begin agitation and measure the pH of the solution in the extractor. If the pH is greater than 5.0, the pH of the solution shall be decreased to 5.0±0.2 by adding 0.5N acetic acid. If the PH is equal to or less than 5.0 no acetic acid should be added. The pH of the solution shall be monitored, as described below, during the course of the extraction and if the pH rises above 5.2, 0.5N acetic acid shall be added to bring the pH down to 5.0±0.2. However, in no event shall the aggregate amount of acid added to the solution exceed 4 ml of acid per gram of solid. The mixture shall be agitated for 24 hours and maintained at 20°-40° C. (68°-104° F.) during this time. It is recommended that the operator monitor and adjust the pH during the course of the extraction with a device such as the Type 45.A pH Controller manufactured by Chemtix, Inc., Hillsboro, Oreg. 97123 or its equivalent, in conjunction with a metering pump and reservoir of 0.5N acetic acid. If such a system is not available the following manual procedure shall be employed:

(a) A pH meter shall be calibrated in accordance with the manufacturer's specifications.

(b) The pH of the solution shall be checked and, if necessary, 0.5N acetic acid shall be manually added to the extractor until the pH reaches 5.0±0.2. The pH of the solution shall be adjusted at 15, 30 and 60 minute intervals, moving to the next longer interval if the pH does not have to be adjusted more than 0.5N pH units.

(c) The adjustment procedure shall be continued for at least 6 hours.

(d) If at the end of the 24-hour extraction period, the pH of the solution is not below 5.2 and the maximum amount of acid (4 ml per gram of solids) has not been added, the pH shall be adjusted to 5.0±0.2 and the extraction continued for an additional four hours, during which the pH shall be adjusted at one hour intervals.

6. At the end of the 24 hour extraction period, deionized water shall be added to the extractor in an amount determined by the following equation:

$$V = (20)(W) - 16(W) - A,$$

where
V = ml deionized water to be added,
W = weight in grams of solid charged to extractor, and
A = mt of 0.5N acetic acid added during extraction 7. The material in the extractor shall be separated into its component liquid and solid phases as described under "Separation Procedure".
8. The liquids resulting from Steps 2 and 7 shall be combined. This combined liquid (or the waste itself if it has less than ½ percent solids, as noted in Step 2) is the extract and shall be analyzed for the presence of contaminants.

SEPARATION PROCEDURE

Equipment:

A filter holder, designed for all filteration media having a nominal pore size of 0.45 micrometers and capable of applying a 5.3 kg/cm² (75 psi) hydrostatic pressure to the solution being filtered, shall be used. For mixtures containing nonabsorptive solids, where separation can be effected without imposing a 5.3 kg/cm² pressure differential, vacuum filters employing a 0.45 micrometers filter media can be used.

Procedure:

This procedure is intended to result in separation of the "free" liquid portion of the waste from any solid matter having a particle size of less than 0.45 cm. If the sample will not filter, various other separation techniques can be used to aid in the filtration. As described above, pressure filtration is employed to speed up the filtration process. This does not alter the nature of the separation. If liquid does not separate during filtration, the waste can be centrifuged. If separation occurs during centrifugation, the liquid portion (centrifugate) is filtered through the 0.45 cm filter prior to becoming mixed with the liquid portion of the waste obtained from the initial filtration. Any material that will not pass through the filter after centrifugation is considered a solid and is extracted.

(i) Following manufacturer's directions the filter unit shall be assembled with a filter bed consisting of a 0.45 micrometer filter membrane. For difficult or slow to filter mixtures, a prefilter bed consisting of the following prefilters in increasing pore size (0.65 micrometer membrane, fine glass fiber prefilter and coarse glass fiber prefilter) can be used.

(ii) The waste shall be poured into the filtration unit.

(iii) The reservoir shall be slowly pressurized until liquid begins to flow from the filtrate outlet at which point the pressure in the filter shall be immediately lowered to 10–15 psig. Filtration shall be continued until liquid flow ceases.

(iv) The pressure shall be increased stepwise in 10 psi increments to 75 psig and filtration continued until flow ceases or the pressurizing gas begins to exit from the filtrate outlet.

(v) The filter unit shall be depressurized, the solid material removed and weighed and then transferred to the extraction apparatus, or, in the case of final filtration prior to analysis, descarded. Do not allow the material retained on the filter pad to dry prior to weighing.

(vi) The liquid phase shall be stored at 4° C. for subsequent use in Step 8.

B. STRUCTURAL INTEGRITY PROCEDURE

Equipment:

A Structural Integrity Tester having a 3.18 cm (1.25 in.) diameter hammer weighing 0.33 kg (0.73 lbs.) and having a free fall of 15.24 cm (6 in.) shall be used. This device is available from Associated Design and Manufacturing Company, Alexandria, Va. 22314 as Part No. 125 or it may be fabricated to meet the specifications described in FIG. 1, appearing in 40 CFR Chapter 1, part 261.

Procedure:

1. The sample holder shall be filled with the material to be tested. If the sample of waste is a large monolithic block, a portion shall be cut from the block having the dimensions of a 3.3 cm (1.3 in.) diameter×7.1 cm (2.8 in.) cylinder. For fixated waste, samples may be cast in the form of a 3.3 cm (1.3 in.) diameter×7.1 cm (2.8 in.) cylinder for purposes of conducting this test. In such cases, the waste may be allowed to cure for 30 days prior to further testing.

2. The sample holder shall be placed into the Structural Integrity Tester, then the hammer shall be raised to its maximum height and dropped. This shall be repeated fifteen times.

3. The material shall be removed from the sample holder, weighed, and transferred to the extraction apparatus for extraction.

ANALYTICAL PROCEDURES FOR ANALYZING EXTRACT CONTAMINANTS

1. The test methods for analyzing the extract for arsenic, barium, cadmium, chromium, lead, mercury, selenium, and silver, "Test Methods for Evaluating Solid Waste, Physical/Chemical Methods", EPA Publication SW-846 [Second Edition, 1982 as amended by Update I (April, 1984), and Update II (April, 1985)] are incorporated herein by reference. Method 3010 from that publication is reproduced in pertinent part as follows.

Transfer a 100 ml representative aliquot of the well-mixed sample to a 150 ml Griffin beaker and add 3 ml of concentrated $HNO_3$. Cover the beaker with a ribbed watch glass. Place the beaker on a hot plate and cautiously evaporate to a low volume (5 ml), making certain that the sample does not boil and that no portion of the bottom of the beaker is allowed to go dry. Cool the beaker and add another 3 ml portion of concentrated $HNO_3$. Re-cover the beaker with a nonribbed watch glass and return to the hot plate. Increase the temperature of the hot plate so that a gentle reflux action occurs. (If a sample is allowed to go to dryness, low recoveries will result. Should this occur, discard the sample and reprepare).

Continue heating, adding additional acid as necessary, until the digestion is complete (generally indicated when the digestate is light in color or does not change in appearance with continued refluxing). Again, uncover the beaker or use a ribbed watch glass, and evaporate to a low volume (3 ml), not allowing any portion of the bottom of the beaker to go dry. Cool the beaker. Add a small quantity of 1:1 HCl (10 mL/100 ml of final solution) and warm the beaker for an additional 15 min to dissolve any precipitate or residue resulting from evaporation.

Wash down the beaker walls and watch the glass with Type II water and when necessary, filter or centrifuge the sample to remove silicates and other insoluble material that could clog the nebulizer. Filtration should be done only if there is concern that insoluble materials may clog the nebulizer. This additional step can cause sample contamination unless the filter and filtering apparatus are thoroughly cleaned and prerinsed with dilute $HNO_3$. Adjust to the final volume of 100 ml with Type II water. The sample is now ready for analysis by flame atomic absorption spectrometry (FLAA) or inductively coupled argon plasma emission spectrometry.

2. For organic contaminants, a mass spectrophotometer is preferably used to determine the concentration of these contaminants.

For all analyses, the methods of standard addition shall be used for quantification of species concentration.

Experience has shown that the total metal content of a toxic metal in earthen mineral matter (expressed in parts per million (ppm)) ordinarily exceeds the concentration of that metal in an extract produced according to the above-reproduced regulations of the Environmental Protection Agency (expressed in milligrams per liter (mg/l)). Accordingly, earthen mineral matter containing less than about 5 ppm arsenic, 100 ppm barium, 1 ppm cadmium, 5 ppm chromium, 5 ppm lead, 0.2 ppm mercury, 1 ppm selenium and 5 ppm silver would not ordinarily produce an extract having a content of any of those metals which exceeds the current EP toxicity limits of the Environmental Protection Agency. Thus, the method of the present invention is particularly well suited for the recycle and reuse of contaminated earthen mineral matter containing at least about 5 ppm arsenic, 100 ppm barium, 1 ppm cadmium, 5 ppm chromium, 5 ppm lead, 0.2 ppm mercury, 1 ppm selenium or 5 ppm silver, material which may constitute a hazardous waste.

The process of the present invention is additionally applicable to the recycle and reuse of earthen mineral matter contaminated with organic solvents, polychlorinated biphenyls, 2,3,7,8 TCDD (dioxin) and other organic contaminants regardless of whether the earthen mineral matter is additionally contaminated with a toxic metal. Because of Environmental Protection Agency regulations governing the disposal of solid wastes containing organic contaminants, the process of the present invention is particularly well adapted for the recycle and reuse of such materials containing a combined total concentration in excess of 2.16 parts per million of the following organic compounds: tetrachloroehtylene, trichloroethylene, methylene chloride, 1,1,1-trichloroethane, carbon tetrachloride, chlorinated fluorocarbons, chlorobenzene, 1,1,2-trichloro-1,2,2-trifluoroethane, ortho-dichlorobenzene, trichlorofluoromethane, 1,1,2-trichloroethane, xylene, acetone, ethyl acetate, ethyl benzene, ethyl ether, methyl isobutyl ketone, n-butyl alcohol, cylcohexanone, methanol, cresols, cresylic acid, nitrobenzene, toluene, methyl ethyl ketone, carbon disulfide, isobtanol, pyridine, benzene, 2-ethoxyethanol, 2-nitropropane, 2,4,5-trichlorophenol, tetrachlorophenol, pentachlorophenol, tetrachlorobenze, pentachlorobenzene, hexachlorobenzene, and polychlorinated biphenyls. Similarly, the process is also well suited for the recycle and use of earthen mineral matter containing in excess of 1 part per billion of 2,3,7,8 TCDD (dioxin). Prior to use of the contaminated matter as a raw material for cement, the organic contaminants are vaporized from the earthen mineral matter and employed as a secondary fuel source in the cement kiln. The organic contaminant free earthen matter is then used as a cement raw material.

Figure 2:
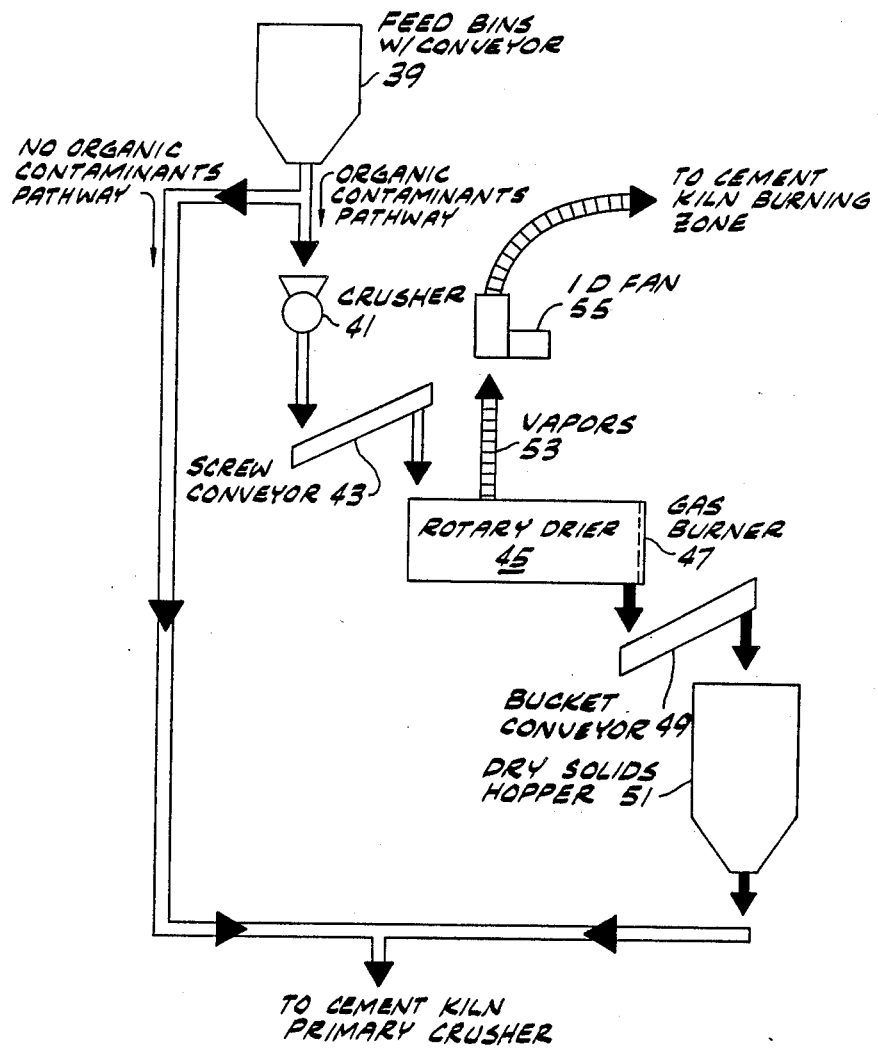
FIG. 2 is a process flow sheet for handling soil, sand and rock contaminated with organic and inorganic contaminants as part of the method of the present invention.

FIG. 2 is a process flow sheet for handling earthen mineral matter contaminated with organic solvents and/or toxic metals. The contaminated earthen mineral matter is fed to the feed bin 39. The storage bins preferably have cone bottoms and feed directly onto the conveyor belts as indicated in FIG. 2. Once in the feed bin, all subsequent conveying and handling of the material is preferably done mechanically, minimizing day to day exposure of personnel to vapors and/or dust. A sprinkler system should be installed for wetting materials during transferring operations in order to minimize dust.

For earthen mineral matter contaminated only with inorganic contaminants, the contaminated material is ready to be sent to the cement kiln primary crusher. However, earthen mineral matter contaminated with organic contaminants is sent from the feed bin 39 to the crusher 41 to reduce the size of the solid material to about two inches in order to maximize the surface area for exposure to heat, to a screw/auger conveyor 43 which conveys the material to the rotary drier 45 with gas burner 47 to drive off the organic vapors via pathway 53 by ID fan 55. The use of the screw/auger conveyor provides a vapor lock between the feed handling areas and the rotary dryer, keeping organic vapors released in the dryer from escaping the process via the feed stream. The screw/auger conveyor is preferably control interlocked with the cement kiln and the dryer's burners such that if either flame is out, or their temperatures drop below their set point, the screw/auger conveyor will automatically be shut down. The organic vapors and waste heat generated by the rotary dryer are used as a secondary fuel source in the rotary kiln 13.

The materials are fed by the screw/auger directly into the solid feed end of the rotary dryer. Preferably, the rotary dryer is a twenty-eight foot long, eighty-eight inch diameter rotary kiln, which acts on the principle of counter-current flow, with heat exchange from natural gas firing to the solids for drying. The speed of rotation, the angle of inclination and the temperature in the firing zone should be balanced to produce temperatures in the range of 500°-1200° F. that are required in order to vaporize organics from solid materials. Depending on the moisture and organic content, the residence time will be between two minutes and fifteen minutes at the specified temperatures. The rotary dryer is preferably lined with castable refractory lining which is four inches thick and can handle temperatures up to 2400° F.

The dried, organic-free solid material is removed from the rotary drier 45, transferred to the bucket conveyor 49 and into the dry solids hopper 51. The earthen mineral matter is then ready to be sent to the cement kiln primary crusher.

Prior to use in the process of the present invention, the contaminated earthen mineral matter is analyzed for composition to assure that the constituents of the waste are known and that they will be compatible with the cement making process. Earthen mineral matter containing inorganic compositions in concentrations known to deleteriously affect the quality of the cement product should be excluded from the process. Moreover, the material should be checked to insure that the earthen mineral matter makes a minimum contribution to the cement composition, i.e., that the earthen matter comprise at least one of the following constituents at or above the indicated concentration: about 16 wt % calcium oxide, about 5 wt. % silica, about 1 wt. % alumina, about 0.5 wt. % $Fe_2O_3$ or about 0.76 wt. % magnesia. If suitable, the contaminated materials are crushed and mixed with the necessary quantity of limestone, shale, clay, sand or other suitable raw materials to achieve the correct mix for the manufacture of cement. As a result, the composition of the blended material is substantially the same as for cement manufactured from materials not containing a toxic metal, the only significant difference being the inclusion of a metal selected from among arsenic, barium, cadmium, chromium, lead, mercury, selenium and silver.

Because there are restrictions upon the emissions of the cement manufacturing plant, the amount of toxic metals input to the cement kiln should be monitored so that the cement manufacturing plants' stack emissions do not exceed those permitted by law or license. For that purpose, it is presently preferred that kiln feed slurry not exceed the following concentrations of toxic metals:

| metal | maximum concentration (ppm) |
|---|---|
| arsenic | 1500 |

-continued

| metal | maximum concentration (ppm) |
|---|---|
| barium | 30000 |
| cadmium | 1000 |
| chromium | 15000 |
| lead | 10000 |
| mercury | 1000 |
| selenium | 1500 |
| silver | 3000 |

The process of the present invention is also suitable for the recycle and reuse of water contaminated with toxic metals. As noted above, the kiln feed slurry preferably comprises about 34 wt. % water and to form the kiln feed slurry, contaminated water may be used in place of clean water or untreated river water. The contaminated water is should be free of organic contaminants and either added directly to the kiln feed slurry tank or added at the raw grinding step.

Any metal particles in the raw materials used to make cement go through a chemical and/or physical change in the process of the present invention. During the heating process, most metals in the system are melted at their respective melting points and are further vaporized as the higher temperatures are attained. However, in separate runs it has been found that 99.78% of the lead input and 93.24% of the mercury input to the kiln are bonded to the dust collected by the precipitators and the clinker product. The produced gases and dust exit the kiln and are captured by the dust collection system which preferably is an electrostatic precipitator. The temperatures at this point in the system are below the boiling point of any of the metals. Any remaining metal vapors, therefore, will collect in the precipitators which will eliminate stack emissions. In addition, dust and particulates are caught in the precipitators and preferably recycled to the burning zone of the kiln as a normal part of the cement manufacturing process. In the elevated temperatures of the burning zone, toxic metals are generally chemically combined to form non-leachable complex silicates and aluminates.

Preferably, the entire resource recovery system is in enclosed structures so that any potential dust problems can easily be controlled and for handling of security provisions. A negative pressure system should be maintained in the building so the dust particles will be captured and passed into the cement kiln's burning zone. The dust particles will then become part of the cement product.

The following examples illustrate the invention.

EXAMPLE 1

A comparison study at a cement manufacturing plant was performed with and without the addition of a supplemental raw material which was slightly contaminated with an inorganic waste. The supplemental material was sand, containing a small amount of lead which exceeded the limits of EP toxicity. Table 1 contains an analysis of the sand, comparing it to typical cement raw materials and product.

During month number 1 of the study, cement was produced as normal for a total monthly production of 54,000 tons of cement clinker. During the second month, 29,900 tons of cement clinker were produced as in the first month, except that 2,000 tons of the contaminated sand material was introduced to the raw mixture prior to the primary crushing step. Table 2 contains an analysis of the sand material. The sand was processed along with the typical materials which were used in cement production throughout the entire cement process.

An analysis of cement produced in both months is compared in Table 3. The data presented in Table 2 reflects that the addition of the contaminated sand material resulted in no discernible effect on either thermal reaction or grinding of the product. The cement showed the same physical and chemical characteristics as the typical cement produced during month number 1 of the study. Table 3 directly compares the maximum, minimum and average test data for the raw mix before input into the cement kiln; and the composite cement, which is the actual cement product after burning, grinding and preparing for sale.

There are no differences demonstrating any influence of the supplementary material being added. The air content is shown to be within testing variation, with no noticeable effect due to the supplemental material. The residues, after the cement is ground to both 200 and 325 mesh, are within very close range of each other. The Wagner and Blaine tests are based on the mesh size, demonstrating the fineness of the particles. The composite strengths at 7 and 28 days demonstrate the strength characteristics of the cement both initially and after a period of time. As shown, neither of these are influenced by the addition of the supplementary materials.

In summary, the data from the trial test demonstrates that no significant changes in the cement product have been made with the addition of the supplementary material.

TABLE 1

A COMPARISON OF THE CONTAMINATED SAND TO TYPICAL RAW MATERIALS AND PRODUCT (WT. %)

| | Slurry (Raw Mix) | Slurry (Loss Free Raw Mix) | Clinker | Hi Silica Limestone | Low Silica Limestone | Shale | Ballistic Sand |
|---|---|---|---|---|---|---|---|
| $SiO_2$ | 14.31 | 22.23 | 23.0 | 30.38 | 6.97 | 53.95 | 79.60 |
| $Al_2O_3$* | 2.80 | 4.37 | 4.55 | 2.11 | 0.49 | 17.55 | 7.64 |
| $Fe_2O_3$ | 1.28 | 2.00 | 2.42 | 1.27 | 0.86 | 4.97 | 0.96 |
| CaO | 42.81 | 66.84 | 65.9 | 35.38 | 47.65 | 5.46 | 2.81 |
| MgO | 1.94 | 3.03 | 2.4 | 1.12 | 2.75 | 2.64 | 0.65 |
| $SO_3$ — | — | 0.4 | — | — | — | — | |
| LOI (loss on ignition) | 35.95 | — | 0.23 | 29.49 | 40.58 | 9.59 | 3.60 |
| $Na_2O$ | — | — | 0.08 | — | — | — | — |
| $K_2O$ — | — | 0.63 | — | — | — | — | |
| FL (free lime) | — | — | 0.33 | — | — | — | — |
| Tons/day | 3000 | 1800 | 99.75 | 99.30 | 94.18 | 95.26 | |

TABLE 1-continued
A COMPARISON OF THE CONTAMINATED SAND TO TYPICAL RAW MATERIALS AND PRODUCT (WT. %)

| | Slurry (Raw Mix) | Slurry (Loss Free Raw Mix) | Clinker | Hi Silica Limestone | Low Silica Limestone | Shale | Ballistic Sand |
|---|---|---|---|---|---|---|---|
| Tons $CO_2$/day | — | 1100 | — | | | | |

*Includes also $P_2O_5$, $TiO_2$ and $Mn_2O_3$, and other minor constituents.

TABLE 2
CHEMICAL COMPOSITION

| | |
|---|---|
| Sand | 50–90% |
| Lead | 0.5% |
| Lead, Aluminum and Steel Slugs | 1–5% |
| Pyrotechnic Mixes from Bullets | 0.00003% |
| Soil | 0–10% |

METALS
EP TOXICITY

TABLE 2-continued

| | ppm | (mg/L) |
|---|---|---|
| Barium | 151.9 | 4.25 |
| Cadmium | 9.2 | None detectable |
| Lead | 500 | 5.59 |
| Copper | 660.8 | 1.97 |
| Zink | 143.3 | 2.68 |
| Antimony | 5.0 | 0.01 |

TABLE 3

| TEST | MONTH 1 MAX | MONTH 1 MIN | MONTH 1 AVG | MONTH 2 MAX | MONTH 2 MIN | MONTH 2 AVG |
|---|---|---|---|---|---|---|
| RAW MIX | | | | | | |
| CaO (%) | 42.7 | 41.7 | 42.2 | 42.5 | 41.6 | 42.1 |
| MgO (%) | 3.0 | 1.8 | 2.4 | 3.1 | 2.2 | 2.5 |
| % WTR | 34.4 | 29.7 | 31.6 | 33.2 | 29.8 | 31.3 |
| 200 MESH RESIDUAL (%) | 29.2 | 22.3 | 26.5 | 31.5 | 29.8 | 27.9 |
| CLINKER | | | | | | |
| $SiO_2$ (%) | 23.60 | 22.40 | 23.00 | 23.10 | 22.00 | 22.70 |
| $Al_2O_3$ 4.66 | 3.78 | 4.30 | 4.49 | 3.10 | 4.04 | |
| $Fe_2O_3$ (%) | 2.87 | 2.34 | 2.56 | 2.96 | 2.53 | 2.71 |
| CaO (%) | 65.90 | 64.60 | 65.40 | 66.20 | 64.30 | 65.30 |
| MgO (%) | 4.20 | 3.10 | 3.70 | 4.60 | 3.40 | 3.80 |
| $SO_3$ 0.80 | 0.20 | 0.30 | 1.20 | 0.20 | 0.50 | |
| LOI (%) | 0.56 | 0.12 | 0.29 | 0.55 | 0.16 | 0.35 |
| S.R. (Calc. Factor) | 3.83 | 3.04 | 3.35 | 4.00 | 3.04 | 3.36 |
| LSF (Calc. Factor) | 93.70 | 89.50 | 91.40 | 94.00 | 89.60 | 92.40 |
| $C_3S$ (Calc. Factor) | 66.10 | 54.50 | 59.30 | 67.30 | 56.10 | 62.50 |
| $C_2S$ (Calc. Factor) | 26.00 | 14.60 | 21.10 | 23.60 | 14.10 | 17.90 |
| $C_3A$ (Calc. Factor) | 8.30 | 5.50 | 7.10 | 7.30 | 3.70 | 6.10 |
| $C_4AF$ (Calc. Factor) | 8.70 | 7.10 | 7.80 | 9.00 | 7.70 | 8.30 |
| $Na_2O$ (%) | 0.14 | 0.07 | 0.09 | 0.12 | 0.05 | 0.09 |
| $K_2O$ (%) | 0.61 | 0.21 | 0.38 | 0.86 | 0.16 | 0.46 |
| $Na_2O$ EQV (Calc. Factor) | 0.54 | 0.22 | 0.30 | 0.69 | 0.17 | 0.40 |
| COMPOSITE CEMENT: | | | | | | |
| % $H_2O$ | 27.00 | 25.20 | 25.80 | 26.00 | 24.60 | 25.50 |
| INITIAL (MM Penetration) | 35.00 | 28.00 | 31.00 | 34.00 | 28.00 | 31.00 |
| FINAL (MM Penetration) | 30.00 | 23.00 | 26.00 | 29.00 | 22.00 | 26.00 |
| % FINAL | 88.00 | 70.00 | 84.00 | 90.00 | 79.00 | 86.00 |
| PACK SET | 8.00 | 2.00 | 4.00 | 7.00 | 4.00 | 5.00 |
| (PHYSICAL PROP.) | | | | | | |
| RESIDUES-200 m (%) | 1.60 | 0.20 | 0.90 | 1.30 | 0.10 | 0.90 |
| RESIDUES 325 M (%) | 13.10 | 3.80 | 8.80 | 12.70 | 6.20 | 9.00 |
| WAGNER ($cm^2$/gm) | 2077 | 1873 | 1986 | 2003 | 1778 | 1906 |
| BLAINE ($cm^2$/gm) | 3602 | 3264 | 3378 | 3620 | 3303 | 3393 |
| AIR CONTENT (%) | 8.20 | 5.70 | 7.30 | 9.00 | 5.90 | 7.70 |
| STRENGTH - 7 DAY (psi) | 4300.00 | 3670.00 | 4110 | 4340.00 | 3630.00 | 4091 |
| STRENGTH - 28 DAY (psi) | 5920.00 | 5190.00 | 5622 | 6060.00 | 5100.00 | 5600 |
| (CHEMICAL PROP.) | | | | | | |
| $SiO_2$ (%) | 21.90 | 21.30 | 21.50 | 22.00 | 21.00 | 21.30 |
| $Al_2O_3$ (%) | 5.52 | 4.21 | 4.66 | 4.91 | 3.86 | 4.34 |
| $Fe_2O_3$ (%) | 2.84 | 2.51 | 2.65 | 2.94 | 2.62 | 2.77 |
| CaO (%) | 64.40 | 63.60 | 64.00 | 64.90 | 63.90 | 64.20 |
| MgO (%) | 3.50 | 2.30 | 2.90 | 3.90 | 2.40 | 3.10 |
| $SO_3$ (%) | 3.00 | 2.40 | 2.80 | 3.00 | 2.70 | 2.80 |
| LOI (%) | 1.28 | 0.71 | 0.96 | 1.35 | 0.84 | 1.02 |
| S.R. (Calc. Factor) | 3.11 | 2.69 | 2.95 | 3.18 | 2.78 | 3.00 |
| LSF (Calc. Factor) | 93.10 | 90.40 | 91.80 | 95.20 | 90.50 | 93.30 |
| $C_3S$ (Calc. Factor) | 57.90 | 49.60 | 53.60 | 63.10 | 50.90 | 57.80 |
| $C_2S$ | 26.00 | 17.90 | 21.30 | 24.70 | 13.50 | 17.60 |

TABLE 3-continued

| TEST | MONTH 1 | | | MONTH 2 | | |
|---|---|---|---|---|---|---|
| | MAX | MIN | AVG | MAX | MIN | AVG |
| (Calc. Factor) C$_3$A | 10.40 | 6.60 | 7.90 | 8.10 | 5.40 | 6.80 |
| (Calc. Factor) C$_4$AF | 8.60 | 7.60 | 8.00 | 8.90 | 8.00 | 8.40 |
| (Calc. Factor) Na$_2$O (%) | 0.14 | 0.08 | 0.11 | 0.12 | 0.07 | 0.10 |
| K$_2$O (%) | 0.76 | 0.34 | 0.49 | 0.76 | 0.31 | 0.51 |
| Na$_2$O EQV (Calc. Factor) | 0.63 | 0.33 | 0.44 | 0.61 | 0.31 | 0.44 |

In view of the above, it will be seen that the several objects of the invention are achieved and other advantages results attained.

As various changes could be made in the above process and compositions without departing from the scope of the invention, it is intended that all matter contained in the above description or shown in the accompanying drawings shall be interpreted as illustrative and not in a limiting sense.

What is claimed is:

1. A method for recycle and reuse of contaminated earthen mineral matter in the manufacture of cement clinker, the earthen mineral matter comprising at least about 16 wt % Fe$_2$O$_3$ or about 0.76 wt. % magnesia, the contaminated earthen mineral matter containing at least about 5 ppm arsenic, about 100 ppm barium, about 1 ppm cadmium, about 5 ppm chromium, about 5 ppm lead, about 0.2 ppm mercury, about 1 ppm selenium, or about 5 ppm silver, the method comprising analyzing the contaminated earthen mineral matter to determine the constituents thereof, mixing the contaminated matter with an amount of inorganic constituents and water to form a raw material slurry having a chemical composition suitable for the manufacture of Portland cement, charging the slurry to a cement kiln, heating the slurry in the kiln to a temperature sufficient to form cement clinker, and removing the cement clinker from the kiln.

2. A method as set forth in claim 1 wherein said earthen mineral matter additionally contains (a) in excess of 1 part per billion of 2,3,7,8 TCDD or (b) a combined total concentration of at least about 2.16 parts per million of one or more organic compounds selected from the group consisting of tetrachloroethylene, trichloroethylene, methylene chloride, 1,1,1-trichloroethane, carbon tetrachloride, chlorinated fluorocarbons, chlorogenzene, 1,1,2-trichloro-1,2,2-trifluoroethane, ortho-diclorobenzene, trichlorofluoromethane, 1,1,2-trichloroethane, xylene, acetone, ethyl acetate, ethyl benzene, ethyl ether, methyl isobutyl ketone, n-butyl alcohol, cylcohexanone, methanol, cresols, cresylic acid, nitrobenzene, toluene, methyl ethyl ketone, carbon disulfide, isobtanol, pyridine, benzene, 2-ethoxyethanol, 2-nitropropane, 2,4,5-trichlorophenol, tetrachlorophenol, pentachlorophenol, tetrachlorobenze, pentachlorobenzene, hexachlorobenzene, and polychlorinated biphenyls, the method further comprising the steps of:

vaporizing said 2,3,7,8 TCDD and/or said organic compounds from the earthen mineral matter prior to the mixing step, recovering said vaporized 2,3,7,8 TCDD and/or said organic compounds, and burning said recovered materials in the cement kiln during the cement forming process.

3. A method for recycle and reuse of water contaminated with at least about 5 mg/l arsenic, about 100 mg/l barium, about 1 mg/l cadmium, about 5 mg/l chromium, about 5 mg/l lead, about 0.2 mg/l mercury, about 1 mg/l selenium, or about 5 mg/l silver, the method comprising forming a slurry of the contaminated water with an effective amount of inorganic substituents to form a raw material slurry having a chemical composition suitable for the manufacture of cement clinker, charging the slurry to the exhaust end of a rotary kiln, charging a fuel to the inlet end of the rotary kiln and igniting the fuel inside the kiln, heating the slurry in the rotary kiln to a temperature sufficient to form cement clinker, and removing the cement clinker from the rotary kiln.

4. A method for recycle and reuse of contaminated earthen mineral matter comprising at least about 16 wt % calcium oxide, about 5 wt. % silica, about 1 wt. % alumina, about 0.5 wt. % Fe$_2$O$_3$ or about 0.76 wt. % magnesia, the earthen mineral matter further containing (a) in excess of 1 part per billion of 2,3,7,8 TCDD or (b) a combined total concentration of at least about 2.16 parts per million of one or more organic compounds selected from the group consisting of tetrachloroethylene, trichloroethylene, methylene chloride, 1,1,1-trichloroethane, carbon tetrachloride, chlorinated fluorocarbons, chlorobenzene, 1,1,2-trichloro-1,2,2-trifluoroethane, ortho-dichlorobenzene, trichlorofluoromethane, 1,1,2-trichloroethane, xylene, acetone, ethyl acetate, ethyl benzene, ethyl ether, methyl isobutyl ketone, n-butyl alcohol, cylcohexanone, methanol, cresols, cresylic acid, nitrobenzene, toluene, methyl ethyl ketone, carbon disulfide, isobtanol, pyridine, benzene, 2-ethoxyethanol, 2-nitropropane, 2,4,5-trichlorophenol, tetrachlorophenol, pentachlorophenol, tetrachlorobenze, pentachlorobenzene, hexachlorobenzene, and polychlorinated biphenyls, the method comprising vaporizing said 2,3,7,8 TCDD and or said organic compounds from the earthen mineral matter and recovering said vaporized 2,3,7,8 TCDD and/or said organic compounds, thereafter mixing the earthen mineral matter with an amount of inorganic constituents and water to form a raw material slurry having a chemical composition suitable for the manufacture of Portland cement, charging the slurry to a cement kiln, heating the slurry in the kiln to a temperature sufficient to form cement clinker, and burning said recovered materials in the cement kiln during the cement forming process, and removing the cement clinker from the rotary kiln.

5. A method as set forth in claim 1 wherein the slurry contains on a loss-free basis about 60-67 wt % CaO, about 17-25 wt % $SiO_2$, about 3-8 wt % $Al_2O_3$, about 0.5-6 wt % $Fe_2O_3$, and about 0.1-5.5 wt % MgO.

6. A method as set forth in claim 1 wherein the slurry contains about 34 wt % water.

7. A method as set forth in claim 2 wherein the vaporization step is carried out in a rotary drier.

8. A method as set forth in claim 2 wherein the earthen mineral matter is heated to a temperature of about 500°-1200° F. during the vaporization step.

9. A method for recycle and reuse of earthen mineral matter containing (A) non-naturally occurring levels of toxic metals or certain organic compounds rendering the earthen mineral matter potentially harmful to human health or the environment, and (B) at least about 16 wt % calcium oxide, about 5 wt % silica, about 1 wt % alumina, about 0.5 wt % $Fe_2O_3$, or about 0.76 wt % magnesia in the manufacture or a cement clinker comprising;
   analyzing the earthen mineral matter to determine the constituents thereof,
   mixing the contaminated matter with an amount of inorganic constituents to form a raw material mix having a chemical composition suitable for the manufacture of Portland cement,
   charging the cement to a cement kiln,
   heating the mixture in the kiln to a temperature sufficient to form a cement clinker, and
   removing the cement clinker from the kiln.

10. A method as set forth in claim 9 wherein said earthen mineral matter additionally contains (a) in excess of 1 part per billion of 2,3,7,8 TCDD or (b) a combined total concentration of at least about 2.16 parts per million of one or more organic compounds selected from the group consisting of tetrachloroethylene, trichloroethylene, methylene chloride, 1,1,1-trichloroethane, carbon tetrachloride, chlorinated fluorocarbons, chlorobenzene, 1,1,2-trichloro-1,2,2-trifluoroethane, ortho-dichlorobenzene, trichlorofluoromethane, 1,1,2-trichloroethane, xylene, acetone, ethyl acetate, ethyl benzene, ethyl ether, methyl isobutyl ketone, n-butyl alcohol, cyclohexanone, methanol, cresols, cresylic acid, nitrobenzene, toluene, methyl ethyl ketone, carbon disulfide, isobtanol, pyridine, benzene, 2-ethoxyethanol, 2-nitropropane, 2,4,5-trichlorophenol, tetra-chlorophenol, pentachlorophenol, tetra-chlorobenze, pentachlorobenzene, hexachlorobenzene, and polychlorinated biphenyls, the method further comprising the steps of:
   vaporizing said 2,3,7,8 TCDD and/or said organic compounds from the earthen mineral matter prior to the mixing step,
   recovering said vaporized 2,3,7,8 TCDD and/or said organic compounds, and
   burning said recovered materials in the cement kiln during the cement forming process.

11. A method as set forth in claim 10 wherein the vaporization step is carried out in a rotary drier.

12. A method as set forth in claim 10 wherein the earthen mineral matter is heated to a temperature to about 500°-1200° F. during the vaporization step.

13. A method as set forth in claim 9 wherein the mixture contains on a loss-free basis between about 60-67 wt % CaO, about 17-25 wt % $SiO_2$, about 3-8 wt % $Al_2O_3$, about 0.5-6 wt % $Fe_2O_3$, and about 0.1-5.5 wt % MgO.

14. A method as set forth in claim 9 wherein said earthen mineral matter is crushed to a size of about two inches prior to the mixing step.

15. A method as set forth in claim 9 wherein the mixture is formed as a slurry.

* * * * *

UNITED STATES PATENT AND TRADEMARK OFFICE
CERTIFICATE OF CORRECTION

PATENT NO. : 4,921,538

DATED : May 1, 1990

INVENTOR(S) : Fred A. Lafser, Jr. and Robert J. Schreiber, Jr.

It is certified that error appears in the above-identified patent and that said Letters Patent is hereby corrected as shown below:

Column 4, line 40, "particular)y", should read ---particularly---.

Column 5, line 34, "40 CFR ẞ24, 1987", should read ---40 CFR §261.24, 1987---.

Column 5, line 48, "equation: (weight", should read ---equation: Percent solids = (weight---.

Column13-14, table 3, line 29, "Al$_2$O$_3$4.66 3.78 4.30 4.49 3.10 4.04", should read ---Al$_2$O$_3$(%) 4.66 3.78 4.30 4.49 4.49 3.10 4.04---.

Column 13-14, table 3, line 33, "SO$_3$0.80 0.20 0.30 1.20 0.20 0.50", should read ---SO$_3$(%) 0.80 0.20 0.30 1.20 0.20 0.50---.

Col. 15, Claim 1, line 28, "16 wt% Fe$_2$O$_3$", should read ---16 wt% calcium oxide, about 5 wt% silica, about 1 wt% alumina, about 0.5 wt% Fe$_2$O$_3$---.

Col. 15, Claim 2, line 52, "chlorogenzene", should read ---chlorobenzene---.

Col. 15, Claim 2, line 53, "diclorobenzene", should read ---dichlorobenzene---.

Col. 17, Claim 9, line 19, "or a cement", should read ---of cement---.

Col. 17. Claim 9, line 23, "the contaminated", should read ---the earthen mineral---.

UNITED STATES PATENT AND TRADEMARK OFFICE
CERTIFICATE OF CORRECTION

PATENT NO. : 4,921,538

DATED : May 1, 1990

INVENTOR(S) : Fred A. Lafser, and Robert J. Schreiber, Jr.

It is certified that error appears in the above-identified patent and that said Letters Patent is hereby corrected as shown below:

Col. 17, line 27, "the cement to", should read ---the raw material mix to---.

Col. 17, line 28, "mixture", should read ---raw material mix---.

Col. 17, line 29, "form a cement", should read ---form cement---.

Col. 18, line 25, "temperature to", should read ---temperature of---.

Signed and Sealed this

Tenth Day of September, 1991

Attest:

HARRY F. MANBECK, JR.

Attesting Officer

Commissioner of Patents and Trademarks